(12) United States Patent
Nabil et al.

(10) Patent No.: US 7,410,199 B2
(45) Date of Patent: Aug. 12, 2008

(54) VEHICLE INCLUDING A RETRACTABLE SLIDING SEAT

(75) Inventors: Ziyad Nabil, Massy (FR); Francois Fourrey, Corquilleroy (FR)

(73) Assignee: Faurecia Sièges d'Automobile, Nanterre (FR)

( * ) Notice: Subject to any disclaimer, the term of this patent is extended or adjusted under 35 U.S.C. 154(b) by 56 days.

(21) Appl. No.: 11/557,792

(22) Filed: Nov. 8, 2006

(65) Prior Publication Data
US 2007/0126253 A1 Jun. 7, 2007

(30) Foreign Application Priority Data
Nov. 18, 2005 (FR) .................................. 05 11728

(51) Int. Cl.
*B60N 2/02* (2006.01)
(52) U.S. Cl. .................................. 296/65.09
(58) Field of Classification Search ............. 296/65.09, 296/65.13, 65.07, 65.01, 69, 65.05
See application file for complete search history.

(56) References Cited

U.S. PATENT DOCUMENTS

| | | | | |
|---|---|---|---|---|
| 5,527,087 A * | 6/1996 | Takeda et al. ................. | 297/15 |
| 5,868,451 A | 2/1999 | Uno et al. | |
| 5,890,758 A | 4/1999 | Pone et al. | |
| 6,318,784 B2 * | 11/2001 | Nishide .................... | 296/65.09 |
| 6,416,107 B1 * | 7/2002 | Kanaguchi et al. ........ | 296/65.09 |
| 6,435,589 B2 * | 8/2002 | Shimizu et al. .......... | 296/65.09 |
| 6,932,424 B2 * | 8/2005 | Rhodes et al. .......... | 296/65.09 |
| 6,962,384 B2 * | 11/2005 | Rhodes et al. .......... | 296/65.11 |
| 6,983,985 B2 * | 1/2006 | McGowan et al. ............. | 296/69 |
| 7,040,685 B2 * | 5/2006 | Sumida et al. .......... | 296/65.09 |
| 7,128,358 B2 * | 10/2006 | Perin ....................... | 296/65.09 |
| 7,252,320 B2 * | 8/2007 | Tsujibayashi et al. .... | 296/65.09 |
| 7,273,243 B2 * | 9/2007 | Prugarewicz ............. | 296/65.09 |
| 2001/0002759 A1 | 6/2001 | Nishide | |
| 2003/0094830 A1 * | 5/2003 | Kamida et al. .......... | 296/65.09 |
| 2004/0100115 A1 | 5/2004 | Rhodes et al. | |
| 2004/0100130 A1 | 5/2004 | Rodes et al. | |

FOREIGN PATENT DOCUMENTS

DE 100 11545 11/2000

OTHER PUBLICATIONS

French Preliminary Search Report FR 0511728; report dated Aug. 4, 2006.
German Office Action issued in related German application 10 2006 054 386.6-16, dated Jan. 22, 2007.

* cited by examiner

*Primary Examiner*—Kiran B. Patel
(74) *Attorney, Agent, or Firm*—Miller, Matthias & Hull

(57) ABSTRACT

A vehicle is disclosed compi isingi a floor; a seat presenting an in-use position and a storage position; a runnet extending along a sliding direction, the tunnet being mounted to turn on the floor about an axis of rotation extending transversely to the sliding direction; and a translation-locking device having an active state and inactive state. The vehicle ftrrther comprises a rotation-locking device having an active state and an inactive state; and a control system for automatically placing the translation-locking device in its inactive state during at least a portion of the displacement of the seat between the in-use position and the storage position.

10 Claims, 7 Drawing Sheets

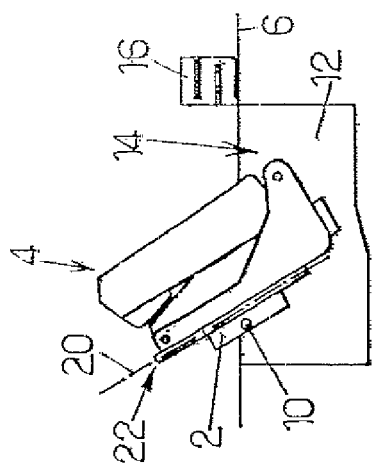
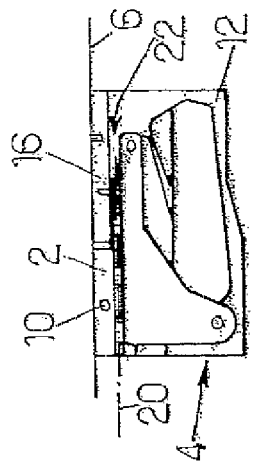
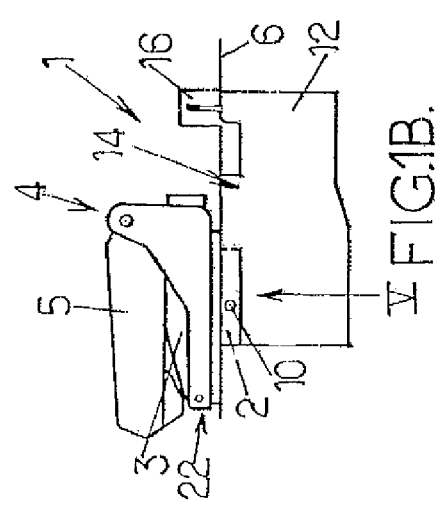
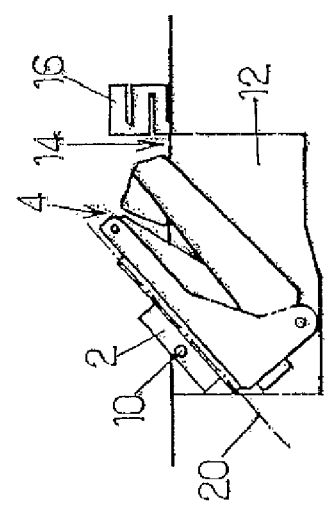
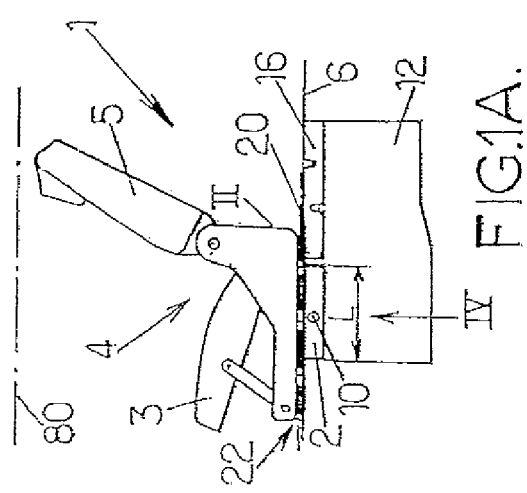
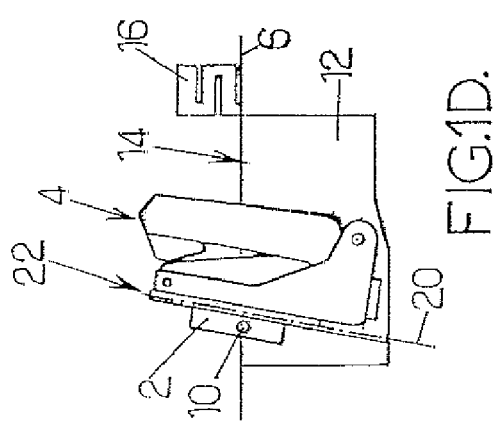

VEHICLE INCLUDING A RETRACTABLE SLIDING SEAT

A VEHICLE INCLUDING A RETRACTABLE SLIDING SEAT

The invention relates to a vehicle including a seat that is retractable by being turned. The invention relates more particularly to retracting an individual seat into a floor.

BACKGROUND OF THE INVENTION

U.S. Pat. No. 6,318,784 discloses a vehicle including a seat and a floor presenting a housing, the seat being capable of pivoting through 180° relative to the floor between an in-use position in which the seat is ready to receive a user, and a storage position in which the seat is retracted into the housing.

SUMMARY OF THE INVENTION

The invention seeks in particular firstly to reduce the size of the seat when it is retracted, and secondly to provide a seat that is simple and ergonomic to use.

To do this, in accordance with the invention, the vehicle includes:
 a floor presenting a housing;
 a seat presenting an in-use position and a storage position, the seat being retracted into the housing when in the storage position; and
 a runner fitted with a translation-locking device, said runner comprising a stationary rail and a moving rail adapted to slide relative to each other in a sliding direction when the translation-locking device is in an inactive state, sliding of the moving rail relative to the stationary rail being prevented when the translation-locking device is in an active state, said seat being connected to the moving rail;
 and the runner is pivotally mounted on the floor about an axis of rotation extending transversely to the sliding direction.

Thus, firstly since the seat is retracted into the floor when it is in its storage position, it is easier to use the vehicle for loading it with articles or for moving about therein, and secondly the seat can be adjusted in the sliding direction, thereby making the vehicle more ergonomic in use.

According to another characteristic in accordance with the invention, the seat comprises a seat proper and a seat back, the seat back forming a slightly obtuse angle relative to the seat proper when the seat is in its in-use position, and the seat back being folded down against the seat proper when the seat in its storage position, and the vehicle further includes a control system for automatically causing the translation-locking device to be placed in its inactive state during at least a portion of the displacement of the seat between the in-use position and the storage position.

Thus, without any need for the user to perform complicated manipulation, and in particular without any need for the user to place the seat in a determined position in the longitudinal position, it is ensured that the seat always occupies the same place when it is in the storage position. In particular, the seat can reach the determined position by sliding along the longitudinal direction under the action of gravity.

According to another characteristic in accordance with the invention, the seat comes into contact with the floor during turning of the runner between the in-use position and the storage position, and vice versa, and the translation-locking device is in its inactive position when the seat comes into contact with the floor, such that contact between the seat and the floor leads to the moving rail sliding relative to the stationary rail in the longitudinal direction.

This reduces the size of the housing by combining both sliding and pivoting of the seat while it is being inserted into the housing.

According to another characteristic in accordance with the invention, the vehicle further includes a rotation-locking device, said device having an active state in which it prevents the runner from pivoting relative to the floor about the axis of rotation and an inactive state in which it allows the runner to pivot relative to the floor about the axis of rotation, and in which the control system automatically places the translation-locking device in its inactive state when the rotation-locking device is in its inactive state.

This simple solution enables the seat to slide progressively under the action of gravity.

Conversely, the control system advantageously automatically places the translation-locking device in its active state when the rotation-locking device is in its active state.

According to an alternative characteristic in accordance with the invention, the control system automatically places the translation-locking device in its inactive state only between an intermediate position in which the sliding direction is inclined relative to the horizontal, and the storage position.

It is thus easier to pivot the seat because it does not start sliding until it has reached the intermediate position.

According to an alternative characteristic in accordance with the invention, the control system automatically places the translation-locking device in its inactive state when the seat back is folded down against the seat proper.

This solution is advantageous in particular because of its simplicity.

According to another characteristic in accordance with the invention, the vehicle further comprises a plate on which the stationary rail is secured, the plate presenting a length in the sliding direction and the axis of rotation being situated substantially in the middle of the plate in the sliding direction to within ⅙th of the length of the plate.

Thus, the volume through which the seat sweeps while it is being turned is relatively small. It is thus easier to enable the seat to be retracted without any need to move seats situated in front of it or behind it, and without any need to open the hatch or the trunk According to another characteristic in accordance with the invention, the axis of rotation is situated in the middle of the plate in the sliding direction and the plate is pivoted through 180° about the axis of rotation between the in-use position and the storage position.

The space through which the seat sweeps is thus further reduced, and in addition the plate can occupy substantially the same position when the seat is in its in-use position and when it is in the storage position.

According to another characteristic in accordance with the invention, the vehicle further includes a rotation-locking device, said device having an active state in which it prevents the runner from pivoting relative to the floor about the axis of rotation, and an inactive state in which it allows the runner to pivot relative to the floor about the axis of rotation, and in which the rotation-locking device is automatically placed in its active state in the in-use position.

Thus, it is easy to avoid any risk of the seat pivoting in unwanted manner.

According to another characteristic in accordance with the invention, the housing is placed under the plate and presents an access opening, and the vehicle further includes a hatch movable between a closure position in which together with the plate it completely closes the access opening to the housing, and a retracted position in which it is away from the access opening.

Thus, the seat is completely hidden in the storage position and the housing is completely hidden when the seat is in its in-use position.

BRIEF DESCRIPTION OF THE DRAWINGS

Other features and advantages of the present invention appear from the following description of non-limiting embodiments, given with reference to the accompanying drawings, in which:

FIGS. 1A, 1B, 1C, 1D, 1E, and 1F show a vehicle in accordance with the invention in six successive positions for the plate between an in-use position and a storage position;

MORE DETAILED DESCRIPTION

Figure 2:
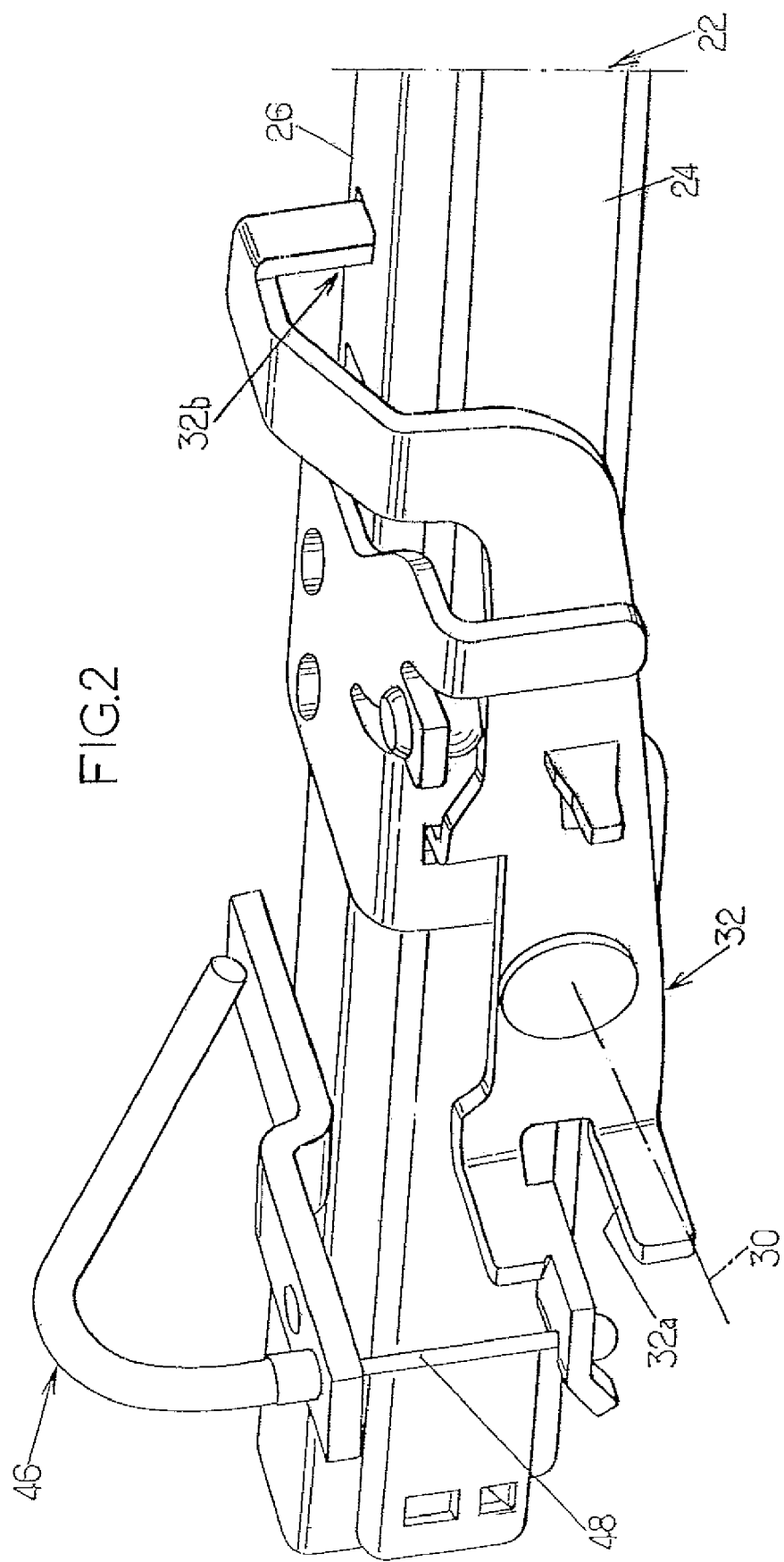
FIG. 2 is a fragmentary perspective view looking along the arrow referenced II in FIG. 1A.

The figures show a vehicle 1 essentially including a floor 6 supporting a plate 2 on which there is held a seat 4. More precisely, the plate 2 has two shafts 8 pivoting in bores 78 formed in the floor 6 and extending along an axis of rotation 10. The plate 2 can thus pivot between an in-use position in which the seat 4 lies above the floor so as to receive a passenger, as shown in FIG. 1A, and a storage position in which the seat 4 is placed beneath the plate 2 in a housing 12 formed in the floor 6.

The plate 2 defines substantially a plane member of substantially rectangular shape. The housing 2 forms a substantially rectangular accommodation extending under the plate 2. The axis of rotation 10 extends substantially horizontally and perpendicularly to a longitudinal direction 80 of the vehicle 1.

The vehicle has two substantially identical runners 22 disposed in parallel. In the description below, only one runner 22 is described in detail.

The runner 22 is interposed between the plate 2 and the seat 4. The runner 22 extends along a sliding direction 20 perpendicular to the axis of rotation 10. It essentially comprises a stationary rail 24 and a moving rail 26 adapted to slide relative to each other along the sliding direction 20. The stationary rail 24 is secured to the plate 2, while the seat 4 is secured to the moving rail 26. In the in-use position, the runner 22 is substantially horizontal and the sliding direction 20 extends substantially parallel to the longitudinal direction 80.

The vehicle also has a translation-locking device presenting an active state in which it prevents the moving rail 26 from sliding relative to the stationary rail 24 in the sliding direction 20, and an inactive state in which it allows the moving rail 26 to slide relative to the stationary rail 24.

Figure 3:
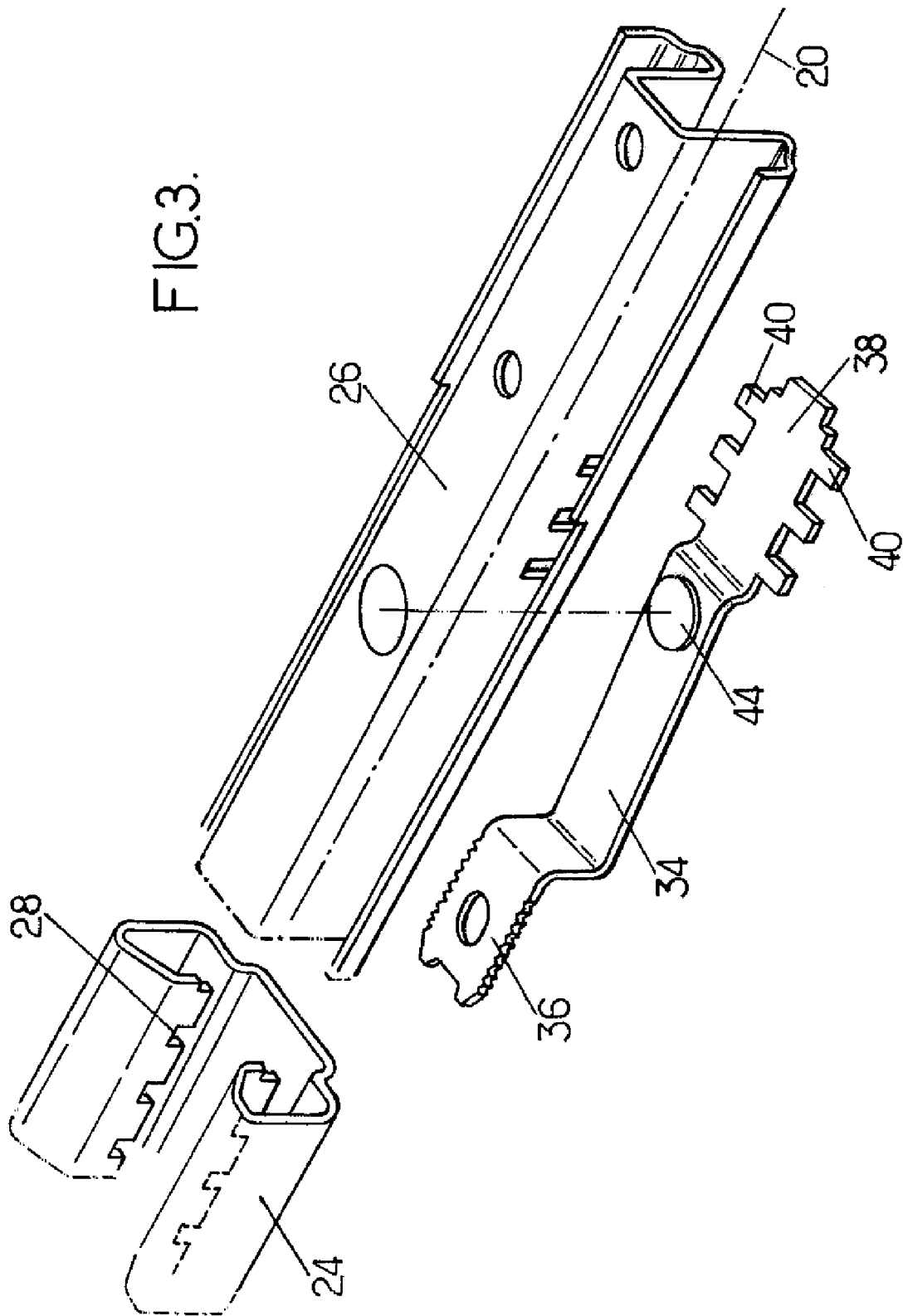
FIG. 3 is an exploded fragmentary view of FIG. 2.

As shown in particular in FIGS. 2 and 3, the translation-locking device essentially comprises a lever 32 mounted to pivot about an axis of rotation 30 on the moving rail 26, notches 28 formed in the stationary rail 24, and a flexible blade 34 presenting teeth 40 for co-operating with the notches 28.

The lever 32 presents a front end 32A and a rear end 32B disposed on opposite sides of the axis of rotation 30. The axis of rotation 30 extends substantially parallel to the axis of rotation 10. A control member (not shown), such as a crossbar or the like, is provided to cooperate with the front end 32A of the lever 32 so as to unlock the runners 22 and allow the position of the seat 4 to be adjusted in the sliding direction 20. The flexible blade 34 has a fastener portion 36 at one end that is secured to the moving rail 26, and at its opposite end it has a locking portion 38 including the teeth 40. Because of the elasticity of the flexible blade 34, the teeth 40 tend to become inserted in the notches 28 of the stationary rail 24. Pivoting the lever 32 about the axis of rotation 30 causes the rear end 32B to move so that it presses against the flexible blade 34 via a pad 44, thereby disengaging the teeth 40 from the notches 28 in the stationary rail and enabling the moving rail 26 to slide in the sliding direction 20 relative to the stationary rail 24.

Pivoting of the lever 32 for the purpose of unlocking the runner 22 can also be controlled via a cable 48 secured to the front end 32A of the lever 32 and sliding in a sheath 46.

The vehicle also includes a rotation-locking device having an active state in which it prevents the plate 2 from pivoting relative to the floor 6 about the axis of rotation 10, and an inactive state in which it allows the plate 2 to pivot relative to the floor 6 about the axis of rotation 10.

In the longitudinal direction, the plate 2 presents a length L, and the rotary shafts 8 extend in the transverse direction and are located in the middle of the plate in the longitudinal direction, such that the plate occupies substantially the same position both in the in-use position and in the storage position.

Figure 4:
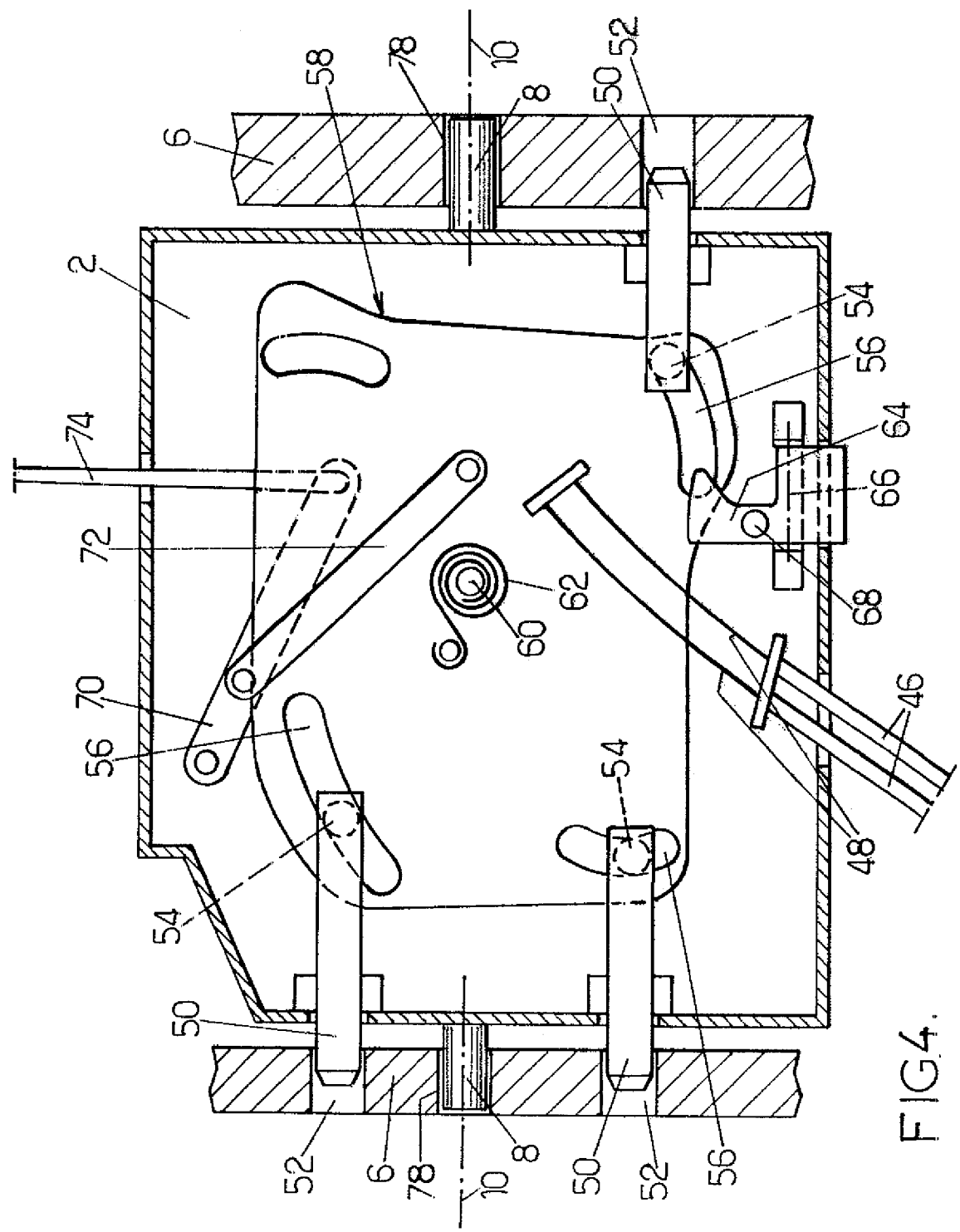
FIG. 4 is a view looking along the arrow referenced IV in FIG. 1A showing a first embodiment of a vehicle in accordance with the invention.
Figure 5:
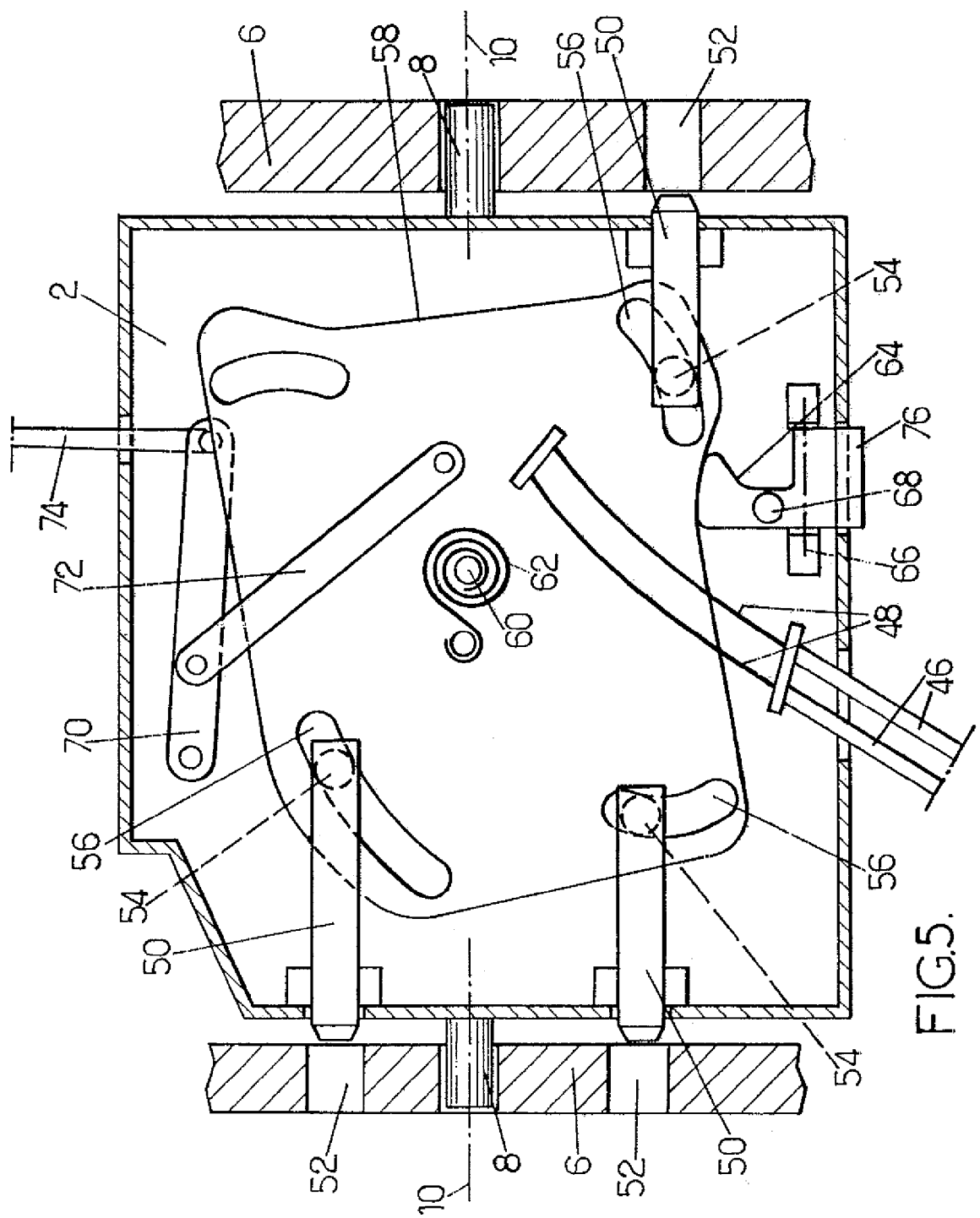
FIG. 5 is a view looking along the arrow referenced V in FIG. 1B showing the first embodiment.

In the embodiment shown in FIGS. 4 and 5, the rotation-locking device comprises a plurality of locking fingers 50 sliding in a direction parallel to the axis of rotation 10, each finger including a stud 54 sliding in a guide slot 56 formed in a control plate 58. The control plate 58 is mounted to pivot relative to the plate 2 about an axis of rotation 60 perpendicular to the sliding direction 20 and to the axis of rotation 10. Rotation of the control plate 58 causes the three locking fingers 50 to extend simultaneously so as to lock the plate 2 in the in-use position by becoming inserted in corresponding bores 52 formed in the floor 6, or vice versa, causing them to be retracted so as to be moved away from the bores 52, in the direction of rotation of the control plate 58.

A torsion spring 62 subjects the control plate 58 to torque tending to cause it to turn so as to bring the locking fingers 50 into their extended position.

A lever 70 mounted to turn relative to the plate 2 about an axis of rotation parallel to the axis of rotation 60 serves to control a connecting rod 72 mounted to rotate at one of its ends on the lever 70 and at its other end on the control plate 58 about axes of rotation that are parallel to the axis of rotation 60 of the control plate 58. A strap 74 secured to the lever 70 serves to turn the control plate 58 about the axis of rotation 60 against the action of the torsion spring 62 by means of the connecting rod 72 and the lever 70 so as to bring the locking fingers 50 into their retracted position, thereby unlocking the plate 2 relative to the floor 6.

When the control plate 58 has turned sufficiently to disengage the control fingers 50 from the bores 52, a tab 64 mounted to pivot about an axis 66 on the plate 2 serves to lock the control plate 58 in this position under drive from the spring 68.

The sheaths 46 are held at one end against the moving rail 26 of each of the runners 22 and at the opposite end to the plate 2. The cables 48 secured at one end to the levers 32 of each of the runners 22 are secured at their opposite ends to the control plate 58, so that turning the control plate 58 causes the locking fingers 50 to be retracted and to act via the control cables 48 to unlock the moving rails 26 of the runners 22.

In the in-use position shown in FIG. 1A, the seat 4 extends over the plate 2, and the housing 12 presents an access opening 14 closed by the plate 2 and a moving hatch 16. This moving hatch 16 is constituted in this example by three flaps pivotally mounted on the floor 6 and to one another so as to fold up concertina-like. When the user desires to retract the seat 4 into the housing 12, the seat back 5 is folded down against the seat proper 3 which is simultaneously lowered. Thereafter, the moving hatch 16 is moved away from the access opening 14 to the housing 2. Thereafter, the user pulls on the strap 74, thereby causing the control plate 58 to turn and bring the locking fingers 50 away from the bores 52, and the teeth 40 away from the notches 28. The seat 4 is then free to slide in the sliding direction 20 relative to the plate 2 by means of the runners 22 and to pivot about the axis of rotation 10 that is stationary relative to the floor 6.

Starting from the position shown in FIG. 1B, by pressing on the rear of the seat 4, the user can cause the seat 4 to pivot about the axis of rotation 10. The sliding direction 20 is then inclined relative to the horizontal, so the seat 4 slides under the effect of gravity along the runners 22 until it reaches a rear end stop, as shown in FIG. 1C.

Under the action of gravity, rotary movement of the seat 4 relative to the floor 6 about the axis for rotation 10 continues. As shown in FIGS. 1D and 1E, when the seat 4 comes into contact with the walls defining the housing 12, and in particular with the bottom wall, the seat 4 slides along the sliding direction by means of the runners 22 and leaves its rear end position, thereby enabling the plate 2 to continue moving in rotation about the axis of rotation 10 until it reaches the storage position which has pivoted through 180° relative to the in-use position, as can be seen in FIG. 1F.

The sliding of the seat 4 along the runners 22 in the sliding direction 20 in combination with turning movement of the plate 2 relative to the floor 6 about the axis of rotation 10 makes it possible to put the seat 4 into a housing 12 of a size that closely matches the size of the seat 4. It is then possible to reclose the moving hatch 16 over the seat 4 in order to close the access opening 14.

In order to reduce wear of the seat 4 due to friction against the bottom wall of the housing 12, this wall is advantageously covered in a material that presents a low coefficient of friction, such as polytetrafluoroethylene (Teflon®).

In order to bring the seat back into the in-use position, starting from the storage position shown in FIG. 1F, the user takes the moving hatch 16 away from the access opening 14 and then causes the plate 2 to pivot about the axis of rotation 10 through 180°. The retention tab 64 presents a release rim 76 which comes to bear against the floor 6 when the plate 2 has returned to the storage position, thereby causing the tab 64 to pivot and moving it away from the control plate 58. Under drive from the torsion spring 62, the control plate 58 then causes the locking fingers 50 to be inserted in the bores 52 and also releases the traction acting on the cables 48, thereby enabling the teeth 40 to come back into engagement with the notches 28 in the stationary rail 24. The seat 4 is then locked against rotation about the axis of rotation 10 and against movement in translation along the sliding direction 20. An adjustment in the sliding direction 20 is nevertheless possible by using the control cross-bar.

FIGS. 6A to 6E show a variant embodiment in which the rotation-locking means essentially comprise studs 150 carried by the plate 2 and two strips 158 disposed on either side of the plate 2, slidable relative to the floor 6 in the longitudinal direction 80.

The strips 158 are substantially identical and their movement in the sliding direction 80 is controlled by a control handle 174. They include openings 152a, 152b, and 152c for receiving the studs 150. The openings 152a include respective notches 154 in the longitudinal direction 80 and a slot 156 extending perpendicularly to the longitudinal direction 80 and to the axis of rotation 10. The openings 152b extending from the ends of the strips 158 in the longitudinal direction 80 do not have slots 156. As the openings 152c, these are lacking in notches 154 in the embodiment shown in FIGS. 6A to 6E so as to avoid locking the plate in the storage position. Nevertheless, in a variant, provision could be made to provide the openings 152c with notches 154 so that they then present a shape substantially opposite to the openings 152a in order to lock the plate in the storage position. The slots 156 serve to stop turning of the plate 2 about the axis of rotation 10. The notches 154 enable the plate 2 to be prevented from turning by holding the studs 150 under the action of a spring tending to move the strips 158 forwards in the longitudinal direction 80 in the absence of any action on the control handle 174.

Figure 6A:
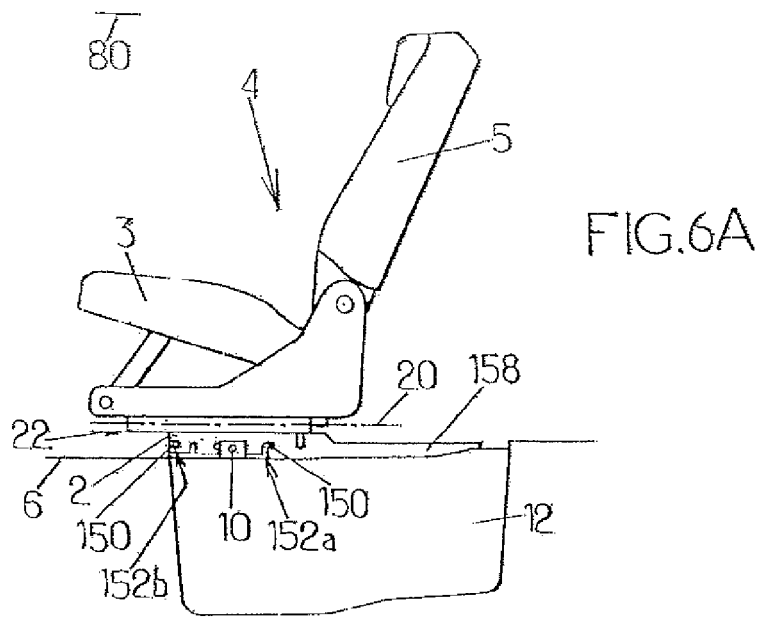
FIGS. 6A, 6B, 6C, 6D, and 6E are fragmentary views on a larger scale of a second embodiment in various successive positions between the in-use position and the storage position.
Figure 6B:
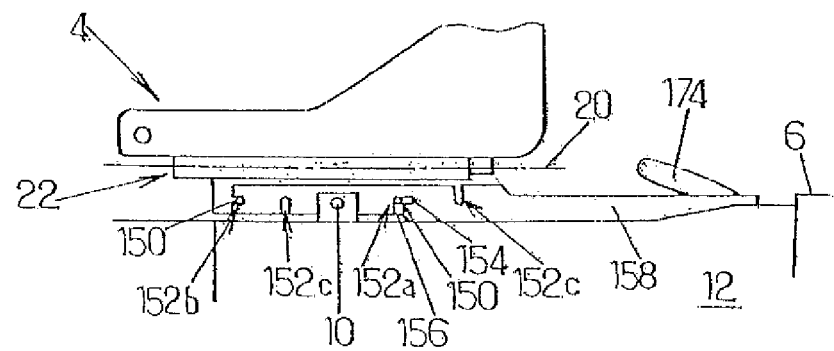
Figure 6C:
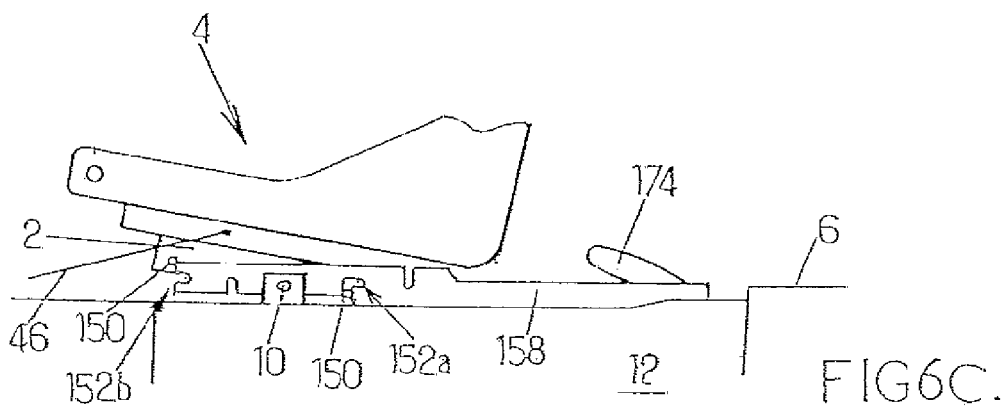

Starting from the in-use position as shown in FIG. 6A, and after moving away the moving hatch 16, the user unlocks the plate 2 relative to rotation about the axis 10 by pulling on the control handle 174. As shown in FIG. 6B, the strips 158 are then reversed along the longitudinal direction 80 so that the studs 150 are spaced apart from the notches 154. The user can then impart turning movement to the plate 2 about the axis of rotation 10, as shown in FIG. 6C.

Figure 6D:
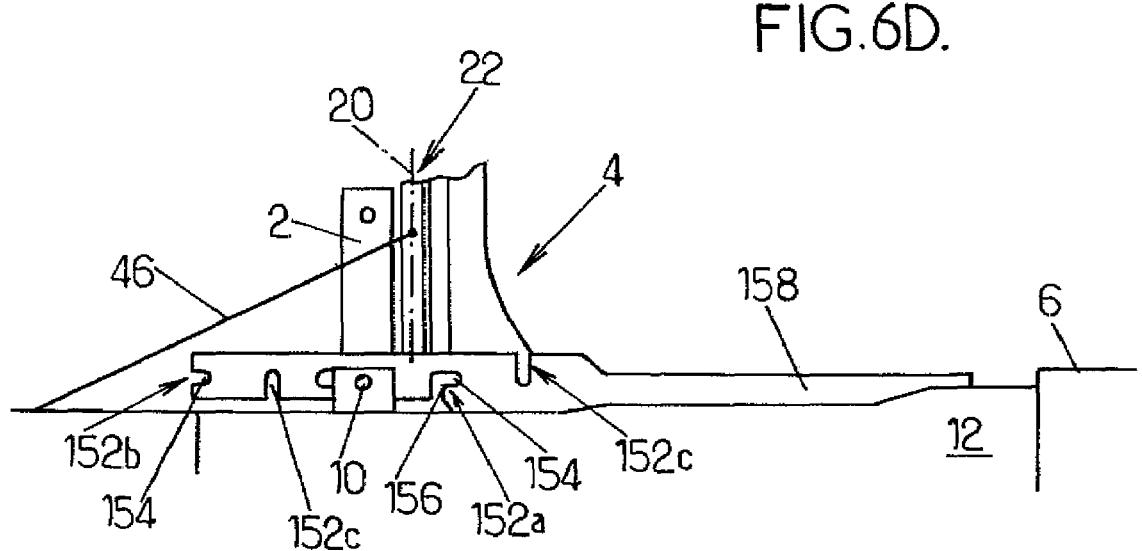

The turning movement of the plate 2 about the axis of rotation 10 towards the storage position applies tension in the cable 46 which, in this embodiment, is held at one end to the lever 32 and at the other end to the floor 6. When the plate 2 is in a substantially vertical intermediate position, as shown in FIG. 6D, the tension acting on the cable 46 is such as to cause the moving rail 26 to be unlocked relative to the stationary rail 24.

Figure 6E:
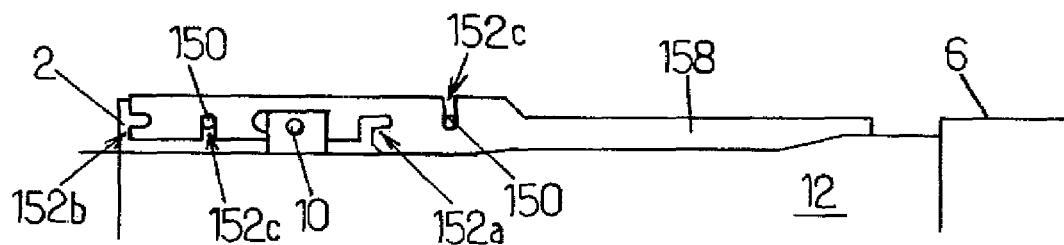

As described above, the seat 4 then continues to move in turning about the axis of rotation 10 and slides simultaneously along the sliding direction 20 by using the runners 22, until it comes into the storage position shown in FIG. 6E. In the storage position, the studs 150 are received in the openings 152c, thereby limiting the amplitude of the turning of the plate 2 about the axis of rotation 10. The plate 2 is then turned through 180° relative to the in-use position.

The axis of rotation 10 of the plate 2 extends across the middle of the plate 2 in the sliding direction 20, so the plate occupies substantially the same portion of the access opening 14 both in the in-use position and in the storage position.

By causing the plate 2 to pivot in the opposite direction, the plate is returned to the in-use position. Once the plate 2 has gone through the intermediate position, the tension in the cable 48 is reduced so that the teeth 40 come back into engagement with the notches 28 in the stationary rail 24. The seat 4 is then locked in translation in the sliding direction 20. When the plate comes into the in-use position, the studs 152a and 152b become inserted in the notches 154 and the plate 2 is then locked in rotation about the axis of rotation 10.

Naturally, the invention is not limited in any way to the embodiments described above by way of non-limiting illustration. In particular, although the seat 4 in the embodiment shown pivots about the axis of rotation 10 in a rearward direction, it would be entirely possible to design it to pivot forwards.

It is also possible to make provision for the translation-locking device 28, 30, 32, 34, 40 to be placed automatically in its inactive state when the seat back is folded down on the seat proper and for it to be placed in its active state when the seat back is returned to its normal in-use position away from the seat proper.

What is claimed is:

1. A vehicle comprising:
    a floor presenting a housing;
    a seat presenting an in-use position and a storage position, the seat being retracted into the housing when in the storage position; and
    a runner fitted with a translation-locking device, said runner comprising a stationary rail and a moving rail adapted to slide relative to each other in a sliding direction when the translation-locking device is in an inactive state, sliding of the moving rail relative to the stationary rail being prevented when the translation-locking device is in an active state, said seat being connected to the moving rail;
    in which vehicle the runner is pivotally mounted on the floor about an axis of rotation extending transversely to the sliding direction.

2. A device according to claim 1, in which the seat comprises a seat proper and a seat back, the seat back forming a slightly obtuse angle relative to the seat proper when the seat is in its in-use position, and the seat back being folded down against the seat proper when the seat in its storage position, and the vehicle further includes a control system for automatically causing the translation-locking device to be placed in its inactive state during at least a portion of the displacement of the seat between the in-use position and the storage position.

3. A vehicle according to claim 1, in which the seat comes into contact with the floor during turning of the runner between the in-use position and the storage position, and vice versa, and the translation-locking device is in its inactive position when the seat comes into contact with the floor; such that contact between the seat and the floor leads to the moving rail sliding relative to the stationary rail in the longitudinal direction.

4. A vehicle according to claim 2, further including a rotation-locking device, said device having an active state in which it prevents the runner from pivoting relative to the floor about the axis of rotation and an inactive state in which it allows the runner to pivot relative to the floor about the axis of rotation, and in which the control system automatically places the translation-locking device in its inactive state when the rotation-locking device is in its inactive state.

5. A vehicle according to according to claim 3, in which the control system automatically places the translation-locking device in its inactive state only between an intermediate position in which the sliding direction is inclined relative to the horizontal, and the storage position.

6. A vehicle according to claim 2, in which the control system automatically places the translation-locking device in its inactive state when the seat back is folded down against the seat proper.

7. A vehicle according to claim 1, further comprising a plate on which the stationary rail is secured, the plate presenting a length in the sliding direction and the axis of rotation being situated substantially in the middle of the plate in the sliding direction to within ⅙th of the length of the plate.

8. A vehicle according to claim 7, wherein the axis of rotation is situated in the middle of the plate in the sliding direction and the plate is pivoted through 180° about the axis of rotation between the in-use position and the storage position.

9. A vehicle according to claim 1, further including a rotation-locking device, said device having an active state in which it prevents the runner from pivoting relative to the floor about the axis of rotation, and an inactive state in which it allows the runner to pivot relative to the floor about the axis of rotation, and in which the rotation-locking device is automatically placed in its active state in the in-use position.

10. A vehicle according to claim 7, in which the housing is placed under the plate and presents an access opening, and the vehicle further includes a hatch movable between a closure position in which together with the plate it completely closes the access opening to the housing, and a retracted position in which it is away born the access opening.

* * * * *